May 7, 1929. C. H. KNUDSEN 1,712,219
FLEXIBLE SHAFT COUPLING
Filed March 12, 1926
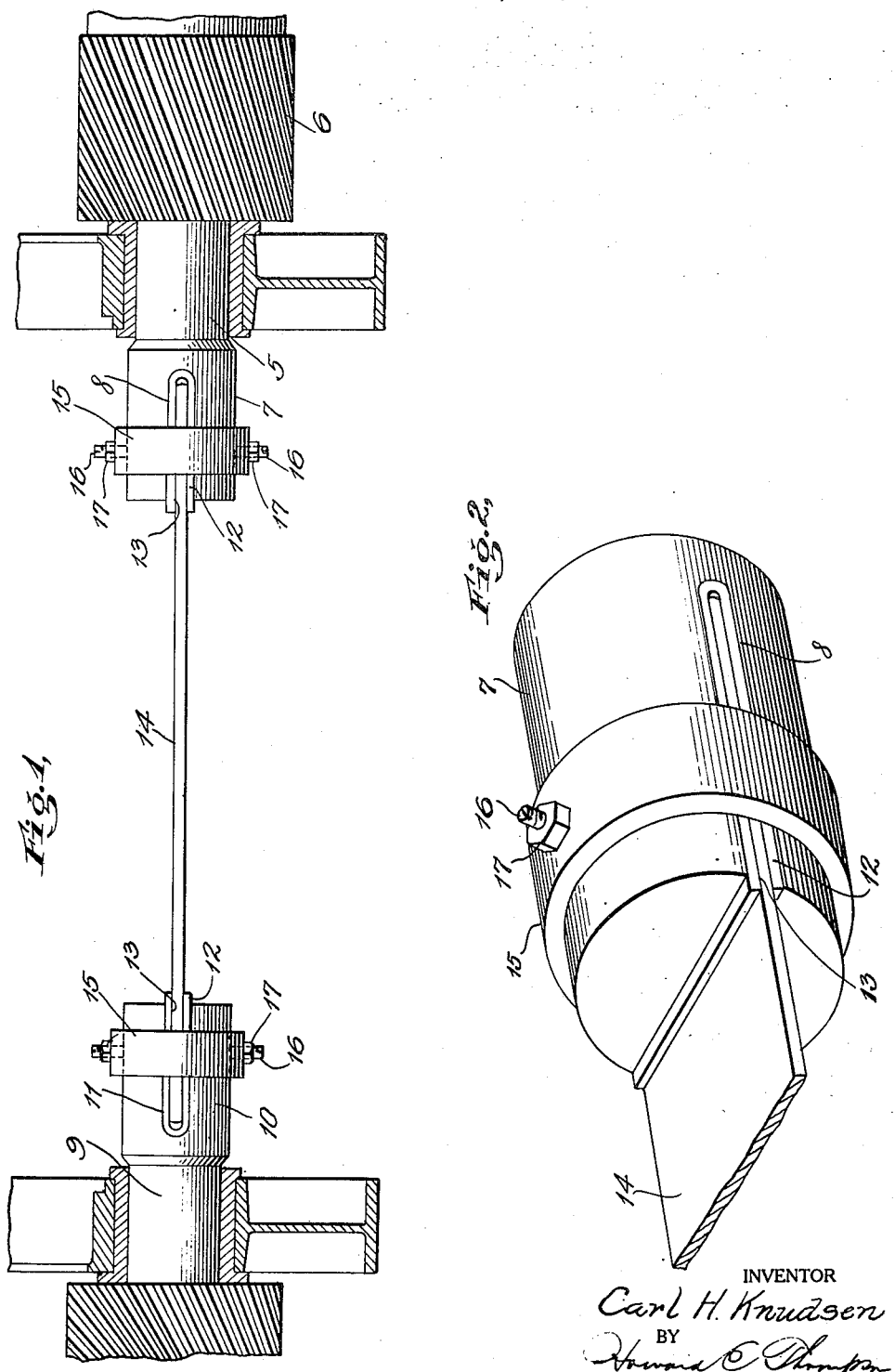
INVENTOR
Carl H. Knudsen
BY
Howard C. Thompson
ATTORNEY Patented May 7, 1929.

1,712,219

UNITED STATES PATENT OFFICE.

CARL H. KNUDSEN, OF BROOKLYN, NEW YORK.

FLEXIBLE SHAFT COUPLING.

Application filed March 12, 1926. Serial No. 94,343.

This invention relates to shaft couplings and particularly to the provision of a flexible or resilient coupling of this class; and the object of the invention is to provide a shaft coupling consisting of a comparatively wide narrow bar of strong spring metal coupled with the ends of the shafts to be coupled together in such manner as to permit of the quick attachment and detachment of said coupling whenever desired and also to provide a strong and durable mounting; a further object being to provide a shaft coupling of the class specified for use in coupling mechanisms or units of different kinds and classes with the shaft or power driven shaft of an engine, whereby the sudden strains and stresses to which the engine and mechanism shafts are subjected, may be compensated for through said resilient coupling; a further object being to provide a coupling of the class described which is mounted axially of the shafts whereby the action of centrifugal forces upon the coupling shaft is obviated or reduced to a minimum, thus preventing vibration between the members so coupled together; and with these and other objects in view, the invention consists in a coupling of the class and for the purpose specified, which is simple in construction, efficient in use, and which may be constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic view showing two shafts of different apparatus or mechanisms coupled together by my improved coupling; and, Fig. 2 is a perspective detail view of one of the shafts shown in Fig. 1 and illustrating the method of mounting the coupling in connection therewith.

In the drawing, I have diagrammatically illustrated at 5, the shaft of an internal combustion engine which may constitute a crank shaft or a power shaft driven from one or more engine crank shafts through a gear 6 on the shaft 5. One end of the shaft 5 is preferably enlarged as seen at 7 and provided with a split 8 in said enlarged portion. I have also indicated in Fig. 1 of the drawing, another shaft 9 in axial alinement with the shaft 5, and in spaced relation therewith the shaft of a mechanism or apparatus driven by the independent shaft 5, for example the shaft of a generator. One end of the shaft 9 is enlarged as seen at 10, and the enlarged portion is split as shown at 11. It will be seen that the splits 8 and 11 extend radially and transversely through the axis of the respective shafts 5 and 9. Mounted in the split of each shaft is a U-shaped bearing member 12 forming in the channel thereof a recess or chamber 13 to receive the end of a coupling bar 14 which snugly fits in said recess or chamber. The transverse dimensions of the U-shaped bearing member 12 and the bar 14 preferably correspond with the dome of the enlarged ends 7—10 of the shafts 5—9 respectively, it being understood that one of the bearing members 12 is inserted in each of the split portions. One end of the coupling bar 14 sets in one bearing and the other end in the other bearing, it being understood that the bar 14 is cut to a size to fit between the adjacent ends of the shafts 5 and 9 and to provide a slight clearance at the base of the recesses 13 in the respective coupling members 12 as clearly seen in Fig. 1 of the drawing.

Mounted upon the enlarged portions 7—10 of the shafts 5—9 are reinforced and retaining collars 15 which encircle the split portions of said shafts and fit snugly thereon, and held in position by one or more set screws 16 having lock nuts 17. The collars 15 in addition to reinforcing the split portions of the shafts also serve to retain the coupling bar 14 against displacement and yet permit of longitudinal movement of the bar with relation to the bearing 12 when the bar 14 is subjected to stresses or strains which would tend to slightly twist the bar 14 against the spring resiliency thereof or provided therein.

It will be understood that the dimensions of the bar 14 will be made to compensate for the stresses or strains to which the same may be subjected and will be composed of strong spring steel, constructed to permit of a twisting spring action in said bar to compensate for the shocks and strains on the respective shafts as above stated. It will also be understood that the enlargement 7—10 on the respective shafts serves to give strength and durability thereto by virtue of the splitting of said shafts, and the extent of the enlargement will depend upon the specific requirements as well as the size and dimensions of the collars 15 employed.

It will be understood that the U-shaped bearings 12 are employed to take up any wear that might result in extended use of the coupling and to avoid the replacement or renewal of the respective shafts 5 and 6, it being understood that when either or both of the bearings 12 become worn, the same may be removed and substituted by new bearings at a very nominal cost. It will also be understood that the outstanding feature of my invention resides not only in the provision of a resilient coupling which will compensate for all of the stresses or strains to which shafts are subjected and which will eliminate the action of centrifugal force to a great degree, but I provide a coupling which is by far simpler in construction, by far more inexpensive than the usual costly and complicated couplings employed and now in common use for the purpose specified. It will also be apparent that in the event of a break due to a flaw in the coupling bar or due to its subjection to abnormal stresses or strains, the same may be replaced at a nominal expense and within a comparatively short period of time.

It will be understood that while I have indicated one use of my improved coupling shaft, that I am not necessarily limited to this use as the coupling herein shown and described may be used for the purpose of coupling two shafts or mechanisms of any kind or class or may be inserted in a single shaft at spaced intervals to compensate for stresses or strains on said shafts, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A coupling of the class described comprising a bar of spring metal, the end of the shaft with which the bar is to be coupled being split through the axis of said shaft to form a socket, said bar being mounted in said socket and contained within the boundaries of said shaft, means for retaining the bar against displacement from said shaft comprising a collar encircling the split portion of the shaft for reinforcing the same, and means for retaining said collar against displacement from the split portion of said shaft.

2. A coupling of the class described comprising a bar of spring metal, the end of the shaft with which the bar is to be coupled being split through the axis of said shaft to form a socket, said bar being mounted in said socket and contained within the boundaries of said shaft, means for retaining the bar against displacement from said shaft comprising a collar encircling the split portion of the shaft for reinforcing the same, means for retaining said collar against displacement from the split portion of said shaft, and a U-shaped bearing in the split portion of the shaft in which said bar is mounted.

3. A coupling of the class described comprising a bar of spring metal, the end of the shaft with which the bar is to be coupled being split through the axis of said shaft to form a socket, said bar being mounted in said socket and contained within the boundaries of said shaft, means for retaining the bar against displacement from said shaft comprising a collar encircling the split portion of the shaft for reinforcing the same, means for retaining said collar against displacement from the split portion of said shaft, a U-shaped bearing in the split portion of the shaft in which said bar is mounted, and the split portion of said shaft being enlarged.

In testimony that I claim the foregoing as my invention I have signed my name this 23rd day of Feb., 1926.

CARL H. KNUDSEN.